(12) United States Patent
Lemmer et al.

(10) Patent No.: US 10,235,629 B2
(45) Date of Patent: Mar. 19, 2019

(54) SENSOR DATA CONFIDENCE ESTIMATION BASED ON STATISTICAL ANALYSIS

(71) Applicant: Southwest Research Institute, San Antonio, TX (US)

(72) Inventors: Stephan J. Lemmer, San Antonio, TX (US); David R. Chambers, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 805 days.

(21) Appl. No.: 14/732,002

(22) Filed: Jun. 5, 2015

(65) Prior Publication Data
US 2016/0358088 A1 Dec. 8, 2016

(51) Int. Cl.
*G06N 7/00* (2006.01)
*G06K 9/62* (2006.01)
*G06N 3/12* (2006.01)
*G06N 99/00* (2019.01)
*G06K 9/00* (2006.01)

(52) U.S. Cl.
CPC ............ *G06N 7/00* (2013.01); *G06K 9/6256* (2013.01); *G06K 9/6277* (2013.01); *G06N 3/126* (2013.01); *G06N 99/005* (2013.01); *G06K 9/00791* (2013.01)

(58) Field of Classification Search
None
See application file for complete search history.

(56) References Cited

U.S. PATENT DOCUMENTS

| 7,787,969 | B2 | 8/2010 | Grichnik et al. |
| 2002/0159642 | A1 | 10/2002 | Whitney |
| 2012/0253746 | A1 | 10/2012 | Kolar |
| 2013/0211659 | A1 | 8/2013 | Peynot et al. |

(Continued)

FOREIGN PATENT DOCUMENTS

| EP | 2138958 A1 | 12/2009 | |
| EP | 3361466 A1 * | 8/2018 | ........ B60W 30/0956 |

OTHER PUBLICATIONS

Zhang, Liang et al.; "Fault detection using genetic programming"; 2004; Elsevier; Mechanical Systems and Signal Processing 19 (2005); pp. 271-289. (Year: 2004).*

(Continued)

*Primary Examiner* — Stanley K. Hill
(74) *Attorney, Agent, or Firm* — Grossman, Tucker et al

(57) ABSTRACT

A method and system is provided for estimation of sensor data confidence based on statistical analysis of different classifier and feature-set (CF) configurations. A method may include: training a classifier of a CF configuration based on a training set of nominal sensor data values; executing the classifier on the training set to generate a first set of confidence values; collecting statistics on the confidence values; calculating a confidence decision threshold based on the collected statistics; executing the classifier on an evaluation set of nominal and degraded sensor data values, to generate a second set of confidence values; deciding whether the sensor data values of the evaluation set are nominal or degraded based on a comparison of the second set of confidence values to the confidence decision threshold; and calculating a score to evaluate the trained classifier based on a verification of the decisions.

17 Claims, 9 Drawing Sheets

(56) References Cited

U.S. PATENT DOCUMENTS

2015/0112571 A1* 4/2015 Schmudderich ...... B60W 30/08
701/93
2018/0231974 A1* 8/2018 Eggert .............. B60W 30/0956

OTHER PUBLICATIONS

Huang, Cheng-Lung; "A GA-based feature selection and parameters optimization for support vector machines"; 2006; Expert Systems with Applications 31 (2006) pp. 231-240. (Year: 2006).*

Brunner, et al, "Visual Metrics for the Evaluation of Sensor Data Quality in Outdoor Perception"; International Journal of Intelligent Control and Systems, vol. 16, No. 2, Jun. 2011, pp. 142-159.

* cited by examiner

SENSOR DATA CONFIDENCE ESTIMATION BASED ON STATISTICAL ANALYSIS

FIELD OF INVENTION

The present disclosure relates to estimation of sensor data confidence, and in particular, to estimation of sensor data confidence based on statistical analysis of classifier and feature-set configurations.

BACKGROUND

Decision making within intelligent systems, such as, for example, autonomous vehicles, typically relies on data provided by a variety of sensors. Evaluating a sensor's performance and the validity of its data are important to developing a system that is capable of detecting and responding to sensor failure, and capable of functioning within dynamic environmental conditions. Sensor data can become unreliable for a variety of reasons, including operating environment, age, occlusion, or physical misalignment. Current autonomous or unmanned vehicle systems generally rely on the ability to constrain environmental and operating conditions, and make the naïve assumption that all sensor data is accurate when delivered in the expected format. Redundant sensors may be added to perform data verification through cross-correlation; however, this can significantly increase the cost and complexity of the vehicle system without necessarily resolving the issue of data integrity. Some systems perform safety checks for the sensors that include periodic monitoring of a "heartbeat" signal and/or checking of the sensor data against a "token" (e.g., a relatively easily identified physical feature at a known location). These may provide some level of data validation, but only against the more obvious cases of sensor failure, for example, when the sensor stops sending data entirely. Furthermore, these techniques only provide a pass/fail (binary) signal, as opposed to a more useful confidence value, or probability, of data integrity.

In less obvious sensor failure conditions, which would not be detected by token detection or sensor heartbeats, incomplete or inaccurate sensor data may be sent to the vehicle's decision-making systems for further processing and evaluation without regard to its integrity or validity. This may lead to relatively serious system failures that can result, for example, in spurious braking and steering events or failure to identify obstacle information, which in turn can present serious safety risks in an autonomous vehicle system.

SUMMARY

The present disclosure relates to estimation of sensor data confidence, and in particular, to estimation of sensor data confidence based on statistical analysis of different classifier and feature-set combinations or CF configurations. Systems and methods described herein provide for statistical identification of sensor data which falls outside of "acceptable norms," as well as the determination of a statistical distribution to identify these acceptable norms.

In some embodiments, a method is provided for estimation of sensor data confidence. The method may include selecting an initial set of classifier and feature-set (CF) configurations. The method may also include performing an iteration for each of the CF configurations, the iteration comprising: training the classifier of the CF configuration based on a training set of nominal sensor data values; executing the classifier on the training set to generate a first set of confidence values; collecting statistics on the first set of confidence values; calculating a confidence decision threshold based on the collected statistics; executing the classifier on an evaluation set of nominal and degraded sensor data values, to generate a second set of confidence values; deciding whether the sensor data values of the evaluation set are nominal or degraded based on a comparison of the second set of confidence values to the confidence decision threshold; and calculating a score to evaluate the trained classifier based on a verification of the decisions. The method may further include generating a next-generation set of CF configurations using a genetic selection algorithm based on the scores.

In some embodiments, a system is provided for estimation of sensor data confidence. The system may include an initialization module to select an initial set of classifier and feature-set (CF) configurations. The system may also include a processing module to perform an iteration for each of the CF configurations. The processing module may include a classifier training module to train the classifier of the CF configuration based on a training set of nominal sensor data values. The processing module may also include a threshold determination module to: execute the classifier on the training set to generate a first set of confidence values; collect statistics on the first set of confidence values; and calculate a confidence decision threshold based on the collected statistics. The processing module may further include a classifier evaluation module to: execute the classifier on an evaluation set of nominal and degraded sensor data values, to generate a second set of confidence values; and decide whether the sensor data values of the evaluation set are nominal or degraded based on a comparison of the second set of confidence values to the confidence decision threshold. The processing module may further include a score calculation module to calculate a score to evaluate the trained classifier based on a verification of the decisions. The system may further include a CF configuration reproduction module to create a next-generation set of CF configurations using a genetic selection algorithm based on the scores.

BRIEF DESCRIPTION OF DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION OF PREFERRED EMBODIMENTS

Figure 1:
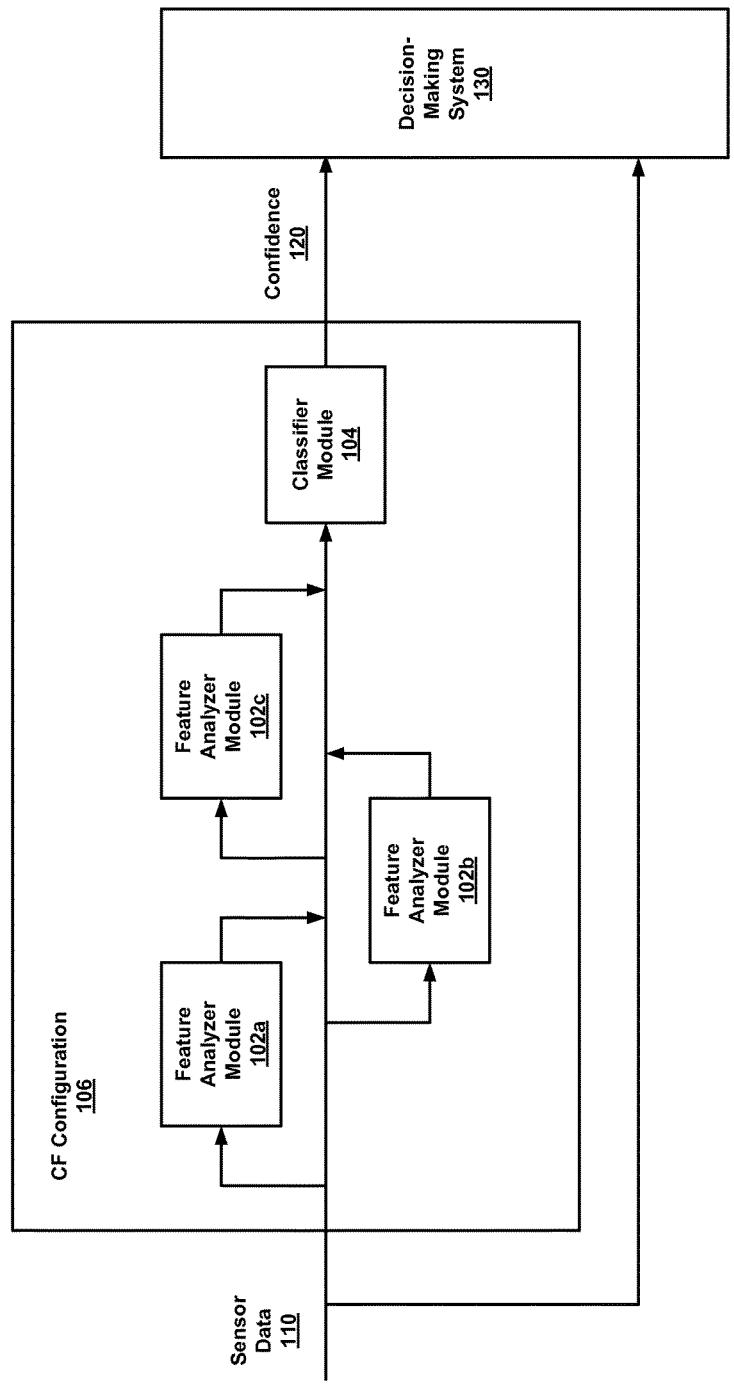
FIG. 1 illustrates a top level system block diagram of one example embodiment consistent with the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Throughout the present description, like reference characters may indicate like structure throughout the several views, and such structure need not be separately discussed. Furthermore, any particular feature(s) of a particular example embodiment may be equally applied to any other example embodiment(s) of this specification as suitable. In other words, features between the various example embodiments described herein are interchangeable, and not exclusive.

The present disclosure relates to estimation of sensor data confidence, and in particular, to estimation of sensor data confidence based on statistical analysis of different classifier and feature-set combinations or CF configurations. Systems and methods described herein provide for statistical identification of sensor data which falls outside of "acceptable norms," as well as the determination of a statistical distribution to identify these acceptable norms.

Referring now to FIG. 1, there is shown a top level system block diagram 100 of one example embodiment consistent with the present disclosure. Sensor data 110, from a variety of different sensors and sensor types, may be provided to a decision making or intelligent system 130 so that the system can determine conditions in the surrounding environment and act appropriately. Such systems may include, for example an autonomous vehicle or a robot. Sensor types may include, for example, video imaging sensors (monochrome, color, infrared, etc.), radar, LIDAR (Light Detection and Ranging) or any other suitable type of sensor.

A confidence value 120, associated with the sensor data, may also be generated and provided to the system 130. The confidence value may be generated by a particular CF configuration 106, which includes a combination of feature analyzer modules 102a, 102b, 102c, and a classifier module 104, to evaluate the sensor data and estimate the degree to which it matches either nominal or degraded data. That is to say, resemblance to nominal data may be associated with a higher confidence while degraded data may be associated with a lower confidence. In some embodiments, the generated confidence may be normalized or scaled to a range of 0-1, with 1 representing the highest confidence. The generated confidence value may be used by the system 130 to assist that system in determining the extent of reliance on, and how best to use, the associated sensor data.

Each feature analyzer module 102 may be configured to analyze a particular set or sets of features or attributes associated with the sensor data. In the case of image data, these features may describe aspects of the image. Such features may include, for example intensity, contrast, texture, edge detection, energy, entropy, homogeneity, local binary patterns, blur and other known image-associated features.

Continuing with this example of image data, feature analyzer module 102a could be configured to cycle through all pixels in a region of interest and calculate maximum, minimum, and average intensity, as well as the standard deviation of intensity, which may be used to estimate contrast. In some embodiments, separate feature analyzer modules may be configured to perform each of the sub-tasks (i.e., maximum, minimum, etc.). Feature analyzer module 102b could be configured to map intensity differences between pixels that are a fixed distance apart, which may be used to estimate texture. Feature analyzer module 102c could be configured to measure spatial frequency within a region of interest to estimate blur. Of course, in general, any number of feature analyzer modules of any type may be employed.

The classifier module 104 may be configured to generate the confidence value 120 which may serve a measure of the "correctness" of the image based on the selected feature-sets, as will be described in greater detail herein. Some examples of known types of classifiers that may be employed include the Neural Network Autoencoder, the Gaussian Mixture Model classifier, the Kernel Density Estimation classifier, the One Class Random Forest classifier and the One Class Support Vector Machine classifier. Additionally, each type of classifier (and feature analyzer) may have a relatively large number of adjustable parameters, thus providing a large universe of potential CF configurations 106.

Classifiers are trained using a training data set that includes nominal (or non-degraded) data. This training allows the classifier to base the classification of new incoming data (during subsequent validation and real-time operational mode) on how well it aligns with the training data.

Any given CF configuration 106 of feature analyzer modules 102 (or feature-sets) and classifier 104 may be arranged in a modular pipeline architecture where the feature analyzers and classifier may be loaded from a library, for example, and "plugged-in" to the pipeline. Any plug-in may be able to access the input sensor data 110 and/or the output of other plug-ins on the pipeline. This modular design approach allows for efficient selection of reconfigurations as will be explained in greater detail in connection with FIG. 4.

For purposes of explanation, embodiments of the present disclosure will be described herein in the context of image sensor data. It will be understood, however, that these principles may be applied equally to other types of sensor data, including, for example, radar, LIDAR, acoustic or other suitable types of data.

Figure 2:
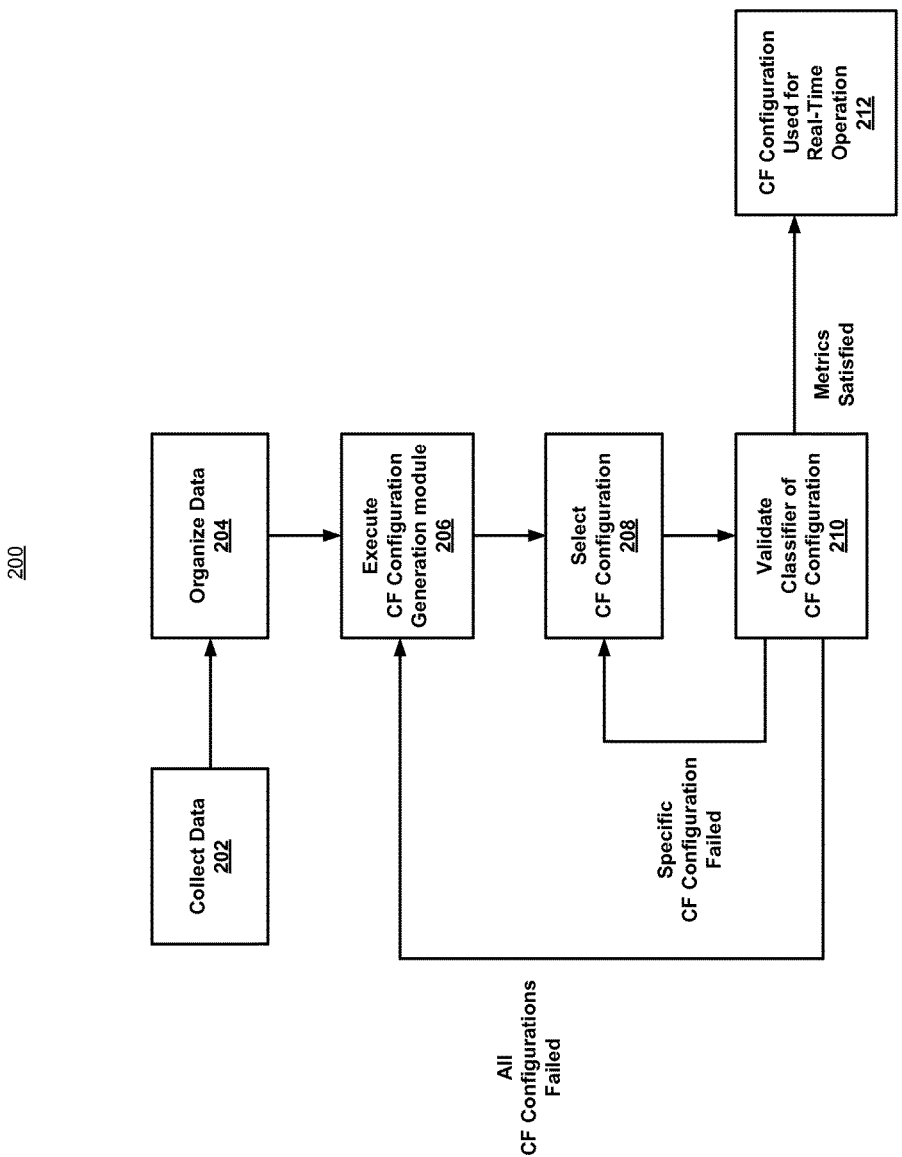
FIG. 2 illustrates a flowchart of operations of an example embodiment consistent with the present disclosure.

FIG. 2 illustrates a top level flowchart of operations 200 of an example embodiment consistent with the present disclosure. At operation 202, data is collected from the sensors. The data may be collected under a variety of conditions and locations including, for example in the case of an autonomous vehicle, both on-road and off-road routes. At operation 204, the data is segregated into degraded and nominal (e.g., non-degraded) categories. The data may further be organized into sets for classifier training, evaluation and validation as will be explained in greater detail in connection with the description of FIG. 3. At operation 206, a CF configuration generation module is executed to generate new CF configurations. The term "CF configuration," as used herein refers to a particular combination of a classifier and a set of feature analyzers (or feature-sets). The new CF configurations may be generated based on an iterative process including a genetic algorithm. The process may start with an initial seeding of random CF configurations 106 and then perform iterations that include evaluation, scoring, selection and possibly mutation to create the next generation of CF configurations. The CF configuration generation module will be explained in greater detail in connection with the description of FIG. 4.

At operation 208, one of the next generation CF configurations is selected. At operation 210, the selected CF configuration classifier is validated by running it against a new data set (e.g., a validation data set). The validation data set may include both nominal and degraded data. A validation module may be provided to execute the selected CF configuration classifier for this purpose. The output of the selected CF configuration classifier may be assessed, for example, by comparing it to selected metrics that may include any suitable measure of correctness. In some embodiments, the assessment may be performed by the human operator. If the selected metrics are satisfied through this validation operation, then that CF configuration may be used for subsequent real-time operation 212 of the decision-making system 130. Otherwise, if a specific CF configuration failed to satisfy the metrics, then a new CF configuration may be selected at operation 208. However, if all CF configurations have failed, then the CF configuration generation module may be re-executed, at operation 206, to generate new CF configurations for testing.

Figure 3:
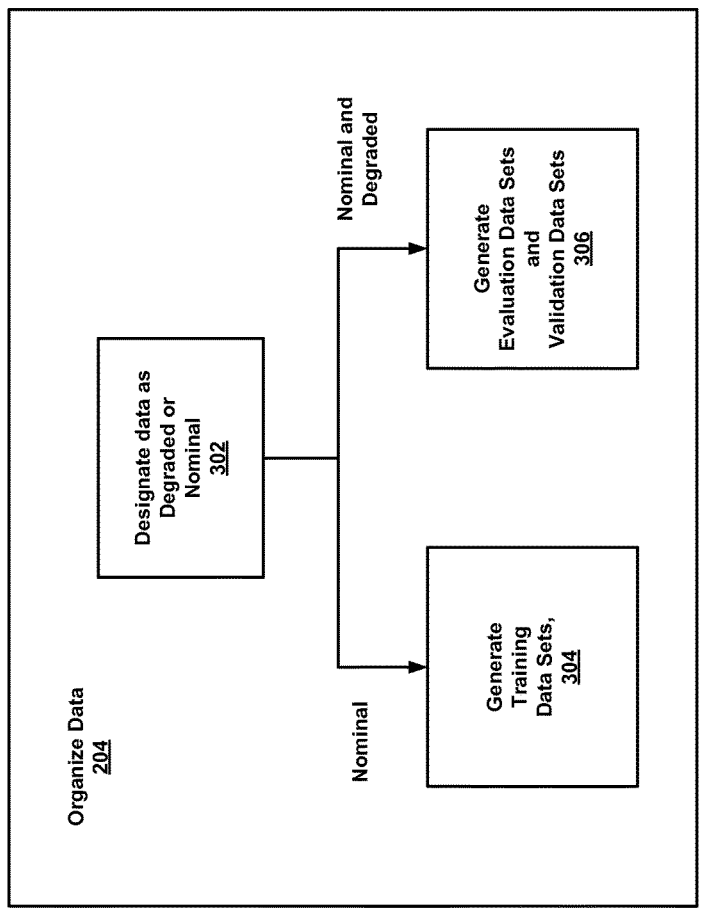
FIG. 3 illustrates a flowchart of operations of an example embodiment consistent with the present disclosure.

FIG. 3 illustrates a flowchart of operations 300 of an example embodiment consistent with the present disclosure. The data organization operation 204 is shown in greater detail. In some embodiments, the data organization operation 204 may be performed by a human operator, for example a person who is relatively expert at interpreting the types of images that may be of interest. In some embodiments, however, a human operator may be replaced by some other automated expert system, not shown or described herein, whether existing or yet to be developed. At operation 302, the sensor data is designated as either degraded or nominal. Degraded image data may include, for example, under or overexposure, lens flare, darkness and water droplets on the lens. At operation 304, nominal data, collected from a variety of locations, may be used to generate training data sets for the classifier. At operation 306, data sets may be generated for classifier evaluation and validation purposes using both nominal and degraded data, also obtained from a variety of locations. Some locations may be reserved to collect data sets exclusively for training, exclusively for evaluation or exclusively for validation. Other locations may be used to collect data sets for combinations of these purposes (e.g., overlapping data sets). One goal of the data collection and organization process is to ensure that the confidence being calculated is based on the presence of visual anomalies and not, for example, on how tall the grass is in a certain area. By allowing some overlap between the training data sets, evaluation data sets and validation data sets, robustness of the classifier may be improved enabling it to perform well in as many environments as possible, including the one in which it was trained.

Figure 4:
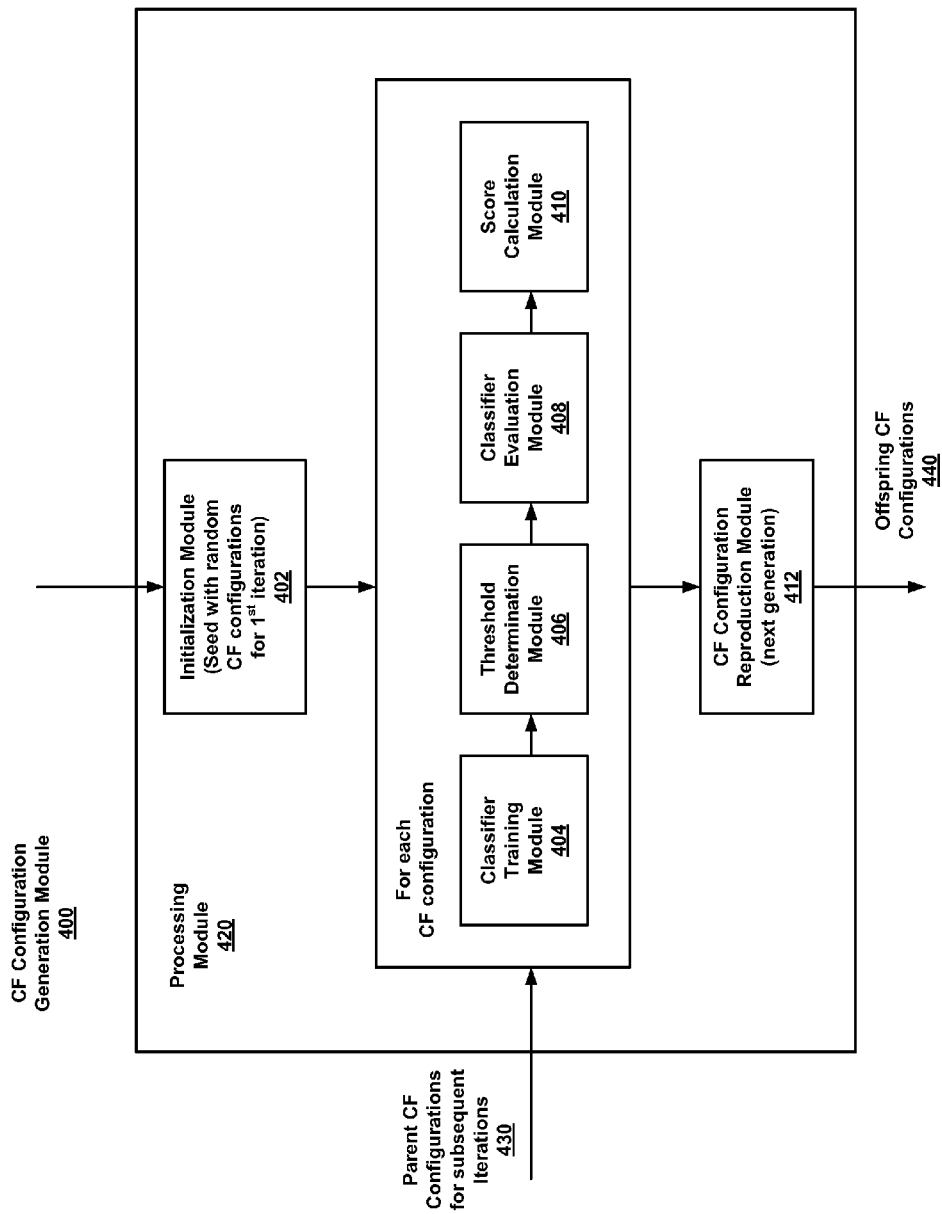
FIG. 4 illustrates a block diagram of an example embodiment consistent with the present disclosure.

FIG. 4 illustrates a block diagram 400 of an example embodiment of the CF configuration generation module, consistent with the present disclosure. The operation of the CF configuration generation module 400 is shown as an iterative process. An initialization module 402 may be configured to generate random CF configurations 106 as seeds for the first iteration to create the first offspring generation 440. On subsequent iterations, offspring CF configurations become parent CF configurations 430, if needed, to create the next generation. For each of these CF configurations, the following operations are performed by a processing module 420. A classifier training module 404 is configured to train the classifier of the CF configuration using one or more of the training data sets. A threshold determination module 406 may be configured to determine confidence decision thresholds. A confidence decision threshold is a confidence value, below which the data is considered degraded as opposed to nominal. The confidence decision thresholds may be determined by running training data through the trained classifiers and measuring statistics of the confidence values generated by the classifiers including, for example, the mean and standard deviation (based on a Gaussian distribution). The confidence decision threshold may be set to a value below the mean, such that the difference between the mean and the confidence value is proportional to the standard deviation. In some embodiments, for example, the confidence decision threshold may be chosen as 2 standard deviations below the mean, although any suitable value may be used.

The classifier evaluation module 408 may be configured to evaluate the classifier by running evaluation data through the classifier and deciding whether the data is nominal or degraded based on a comparison of the confidence outputs to the confidence decision threshold. The evaluation data may include both nominal and degraded data. These decisions may then be compared to the nominal/degraded determination previously made by the human operator in operation 204 (or by other suitable means) which are assumed to be correct. The comparison may be used to calculate a percent missed ($P_m$), representing degraded data points that were classified as nominal, and a percent false positive ($P_f$), representing nominal data points that were classified as degraded.

Score calculation module 410 may be configured to calculate a score (S), for example as an average based on $P_m$ and $P_f$. In some embodiments, the score may be calculated as:

$$S = \frac{(1 - P_m) + (1 - P_f)}{2}$$

Where $P_m$, $P_f$ are normalized to a range of 0-1. In some embodiments, the score may be calculated as:

$$S = \begin{cases} \frac{(1 - P_m) + (1 - P_f)}{2} & t < T \\ \frac{(1 - P_m) + (1 - P_f)}{2}(1 - t) & t \geq T \end{cases}$$

Where t represents the time required to process the data sample. The processing time t may be used as a penalty factor in the score calculation (e.g., to reduce the score) when t exceeds a threshold value T. In some embodiments, the threshold time T may correspond to a data transmission period of the sensor.

In some embodiments, other suitable scoring systems may be employed, depending on the application, to minimize the false positive rate ($P_f$), minimize the miss rate ($P_m$), minimize the processing time (t) and/or minimize any weighted combination of the above.

CF Configuration Reproduction Module 412 may be configured to create a next generation of CF configurations. In some embodiments, a genetic algorithm is used for this purpose, as described in connection with FIGS. 5 and 6.

Figure 5:
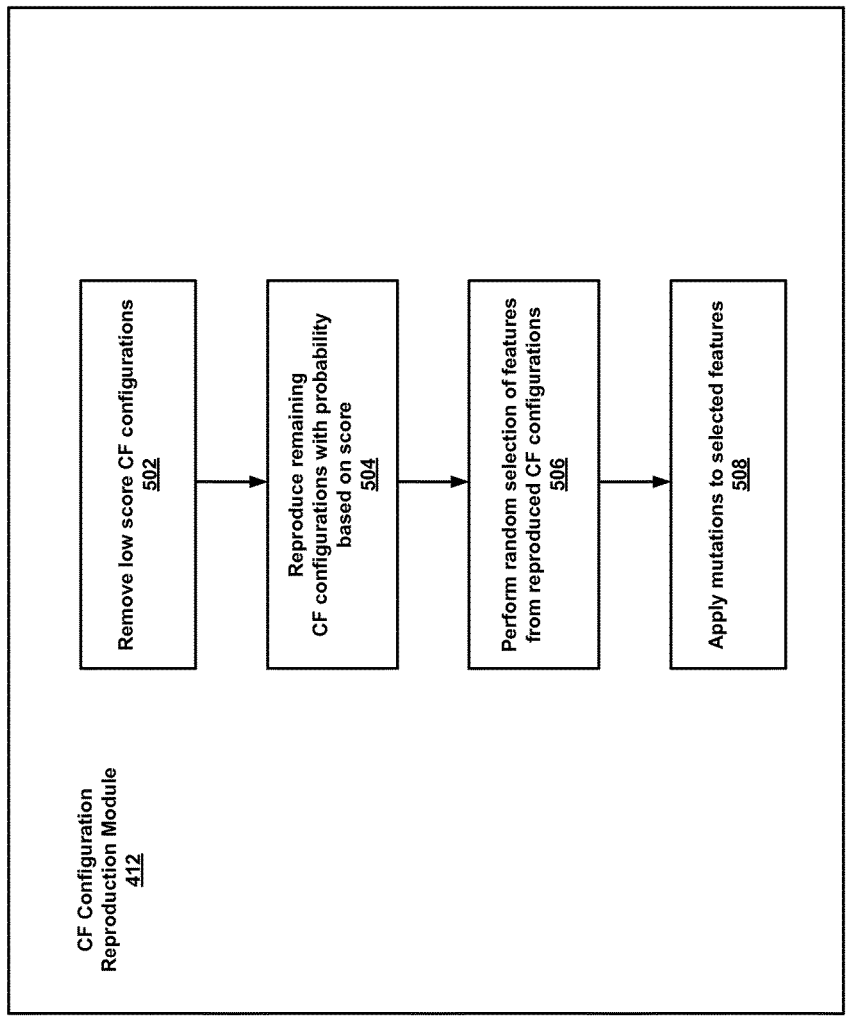
FIG. 5 illustrates a block diagram of an example embodiment consistent with the present disclosure.

FIG. 5 illustrates a block diagram 500 of an example embodiment consistent with the present disclosure. The CF Configuration Reproduction Module 412 is shown to be configured to execute the following operations. At operation

502, existing "parent" CF configurations with the lowest scores are removed to cull out less desirable CF configurations. At operation 504, the remaining parent CF configurations are reproduced (e.g., allowed to propagate to the next "offspring" generation) with a probability that is related to the score. In other words, higher scoring parent CF configurations will continue on to the next generation in greater numbers than lower scoring parent CF configurations. Reproducing parent CF configurations are organized into pairs and, at operation 506, feature-sets from each pair of parent CF configurations are randomly selected for incorporation in the offspring CF configurations, along with mutations that may be introduced in some of the offspring, as will be explained in greater detail.

Figure 6:
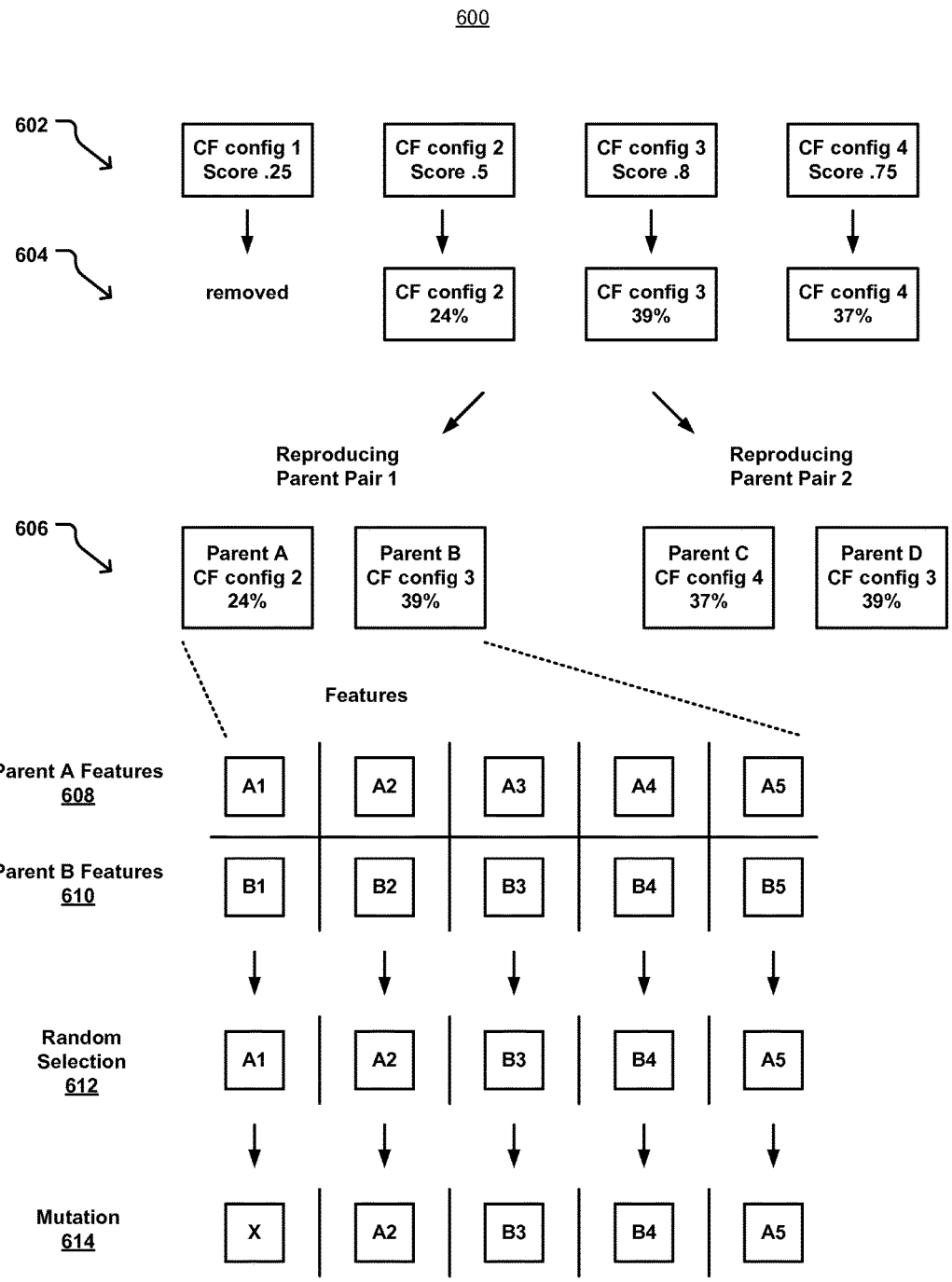
FIG. 6 illustrates a data flow in accordance with an example embodiment consistent with the present disclosure.

Referring now to FIG. 6, a simplified example of only four CF configurations, including numerical values, is presented to illustrate a sample application of an embodiment of the genetic algorithm. Four parent CF configurations 602 are shown with scores of 0.25, 0.5, 0.8 and 0.75 respectively. At 604, CF configuration 1 is removed due to its low score of 0.25, which is below the score of all other configurations. Reproduction probabilities may be calculated for the remaining CF configurations, for example, based on their score divided by the sum of the scores of all remaining CF configurations. For example, CF configuration 2 is assigned a reproduction probability of 24% which is 0.5/(0.5+0.8+0.75).

Reproducing parent pairs 606 are then formed from CF configurations 2, 3 and 4 based on the reproduction probabilities. Parent pair 1 includes parent A from CF configuration 2 and parent B from CF configuration 3. Parent pair 2 includes parent C from CF configuration 4 and parent D from CF configuration 3. CF configuration 3 appears in both parent pairs because it has the highest score (0.8) and thus the highest reproduction probability (39%).

Attention is drawn now to parent pair 1 (parents A and B) although the following discussion will similarly apply to all other parent pairs. In this example, parent A is shown to have 5 feature-sets 608 (A1 through A5) and likewise parent B is shown to have 5 feature-sets 610 (B1 through B5). The feature-sets may be thought of as being arranged in an array of 2 rows and 5 columns, although this is merely an example and does not imply the use of a specific data structure format. Random selection for the offspring 612 is performed by randomly selecting feature-sets from each parent. For example, the first two feature-sets of the offspring (A1 and A2) are selected from parent A, the next two feature-sets (B3 and B4) are selected from parent B, etc. A random mutation 614 may also be introduced, where any feature of the offspring can be replaced with a randomly selected feature (X). Such mutations may be introduced with a generally low probability. For example, in some embodiments, less than 10 percent of offspring features may be mutated. In some embodiments, less than 1 percent of offspring features may be mutated. The final selection of offspring feature-sets may then be used with one of the parent classifiers to form an offspring CF configuration.

As previously mentioned, this example is simplified for illustration. Although only 4 CF configurations were shown, in general any number of CF configurations may be used. Similarly, in general, any number of reproducing pairs and any number of feature-sets may be used. Also, reproducing pairs may generate any number of offspring, and reproducing pairs may include any number of parents, rather than just two as in this example.

The offspring CF configurations may then be tested (validation operation 210) to determine if one is suitable for real-time operation or if another iteration of the CF Generation Configuration module 400 is required. The validation may be performed by the human operator or another suitable system.

Figure 7:
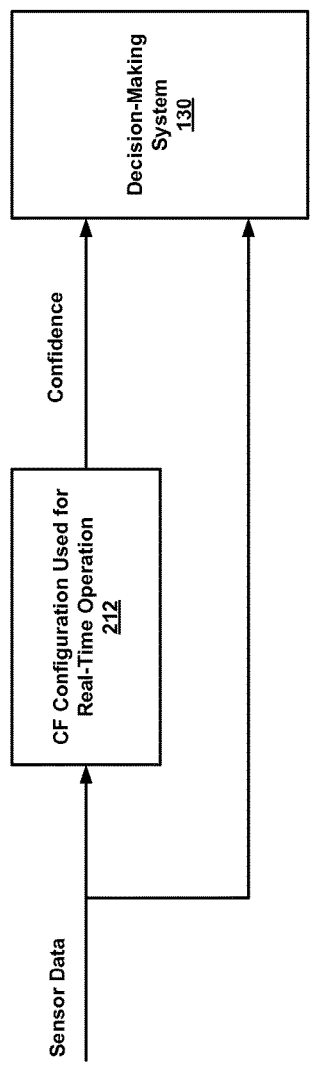
FIG. 7 illustrates a system block diagram of one example embodiment consistent with the present disclosure.

FIG. 7 illustrates a system block diagram 700 of one example embodiment consistent with the present disclosure. When a suitable CF configuration 212 is selected for real-time operation, that selected CF configuration may be employed as illustrated in FIG. 7. Sensor data may be provided in parallel to the real-time CF configuration 212 and the decision-making system 130. The CF configuration 212 evaluates the sensor data and generates a confidence value which is reported to the decision-making system 130 to assist that system in judging how best to use the sensor data. In applications where the decision-making system 130 is not configured to receive and interpret confidence values, the output of the CF configuration 212 may be ignored and the system may continue to operate.

Figure 8:
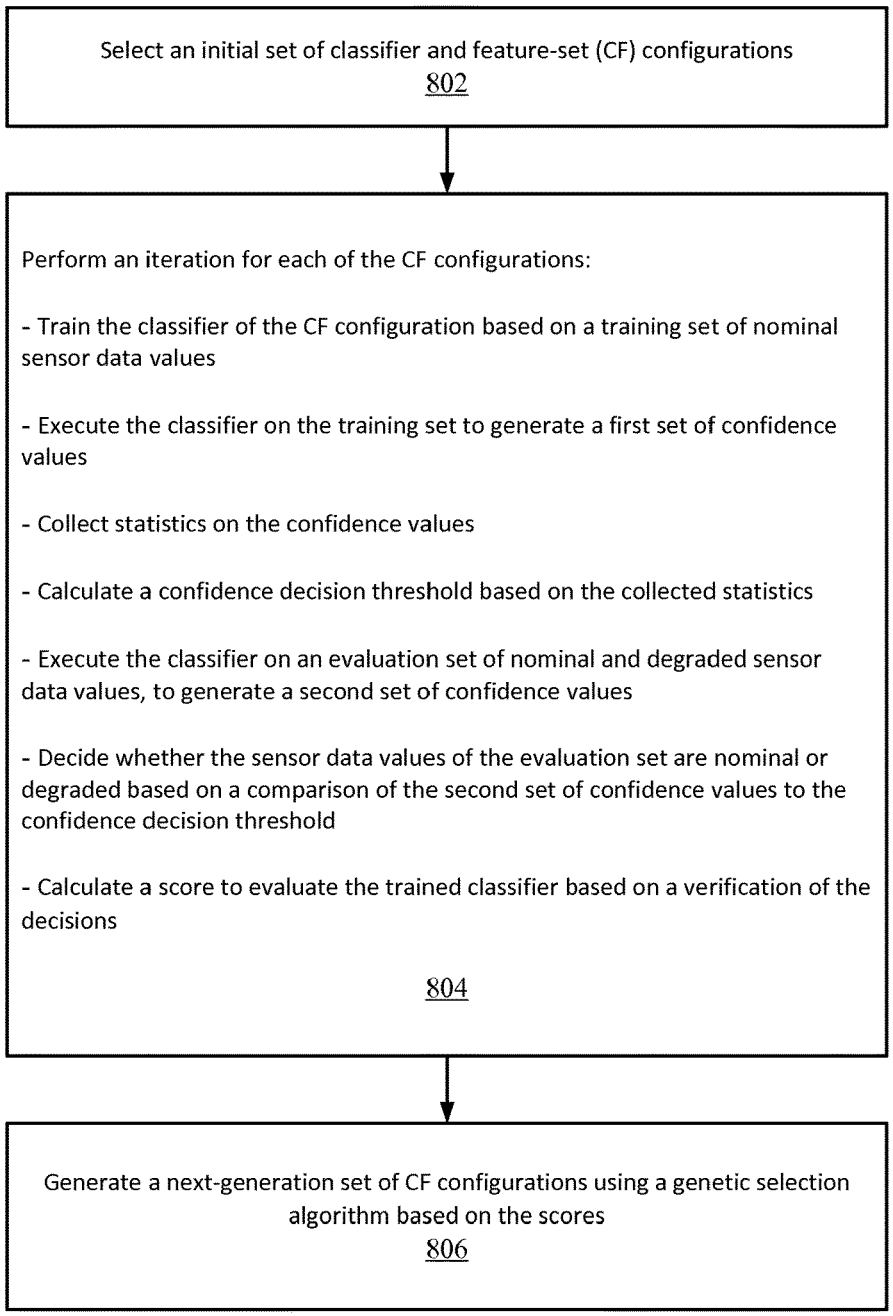
FIG. 8 illustrates a flowchart of operations of an example embodiment consistent with the present disclosure.

FIG. 8 illustrates a flowchart of operations 800 of another example embodiment consistent with the present disclosure. The operations provide a method for estimation of sensor data confidence. At operation 802, an initial set of classifier and feature-set (CF) configurations is selected. At operation 804, an iteration is performed for each of the CF configurations. Each iteration includes: training the classifier of the CF configuration based on a training set of nominal sensor data values; executing the classifier on the training set to generate a first set of confidence values; collecting statistics on the confidence values; calculate a confidence decision threshold based on the collected statistics; executing the classifier on an evaluation set of nominal and degraded sensor data values, to generate a second set of confidence values; deciding whether the sensor data values of the evaluation set are nominal or degraded based on a comparison of the second set of confidence values to the confidence decision threshold; and calculating a score to evaluate the trained classifier based on a verification of the decisions. At operation 806, a next-generation set of CF configurations is generated using a genetic selection algorithm based on the scores.

Figure 9:
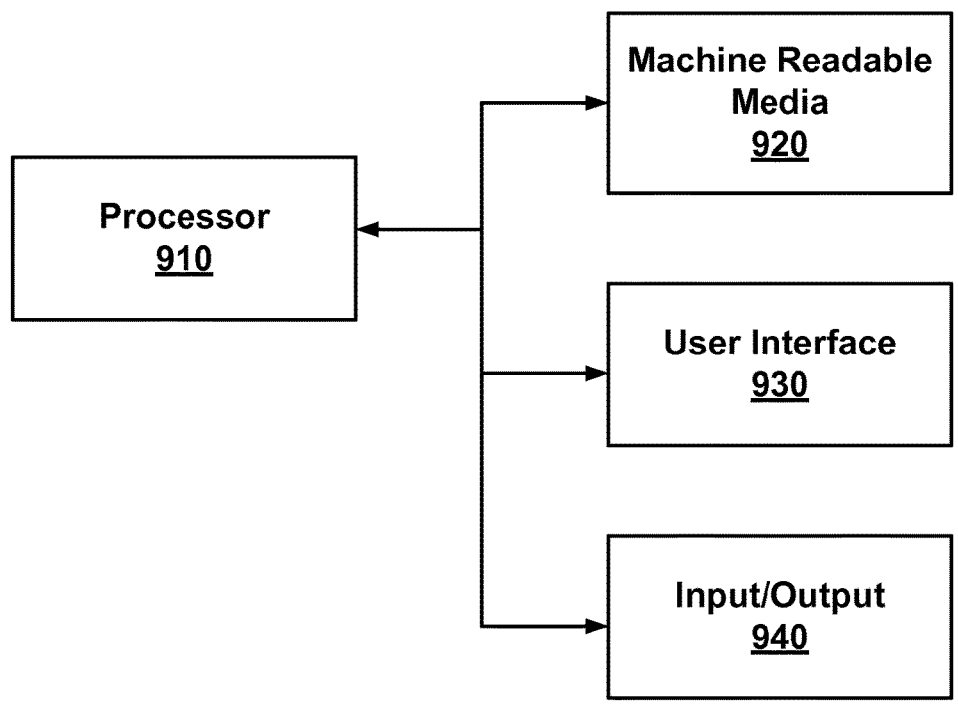
FIG. 9 illustrates a processor, machine readable media, user interface and sensor input that may be employed in an example embodiment consistent with the present disclosure.

In view of the foregoing, it may be appreciated that the present disclosure also relates to an article comprising a non-transitory storage medium having stored thereon instructions that when executed by a machine result in the performance of the steps of the methods as described in the examples above such as, for example, in connection with the description associated with FIG. 8. In some embodiments, the method operations may be implemented in software and executed by a processor or may be implemented in hardware such as, for example, an application specific integrated circuit (ASIC) or field programmable gate array (FPGA). It should also be appreciated that the functionality described herein for the embodiments of the present invention may therefore be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any non-transitory media capable of storing instructions adapted to be executed by a processor. Non-transitory media include all computer-readable media with the exception of a transitory, propagating signal. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. Accordingly, in the broad context of the present invention, and with attention to FIG. 9, the system and method for the herein disclosed improved flash memory access may be accomplished with a processor (910), machine readable media (920), user interface (930) and sensor input (940).

Thus the present disclosure provides methods and systems for estimation of sensor data confidence based on statistical analysis of different CF configurations. According to one aspect there is provided a method. The method may include selecting an initial set of classifier and feature-set (CF) configurations. The method may also include performing an iteration for each of the CF configurations, the iteration comprising: training the classifier of the CF configuration based on a training set of nominal sensor data values; executing the classifier on the training set to generate a first set of confidence values; collecting statistics on the first set of confidence values; calculating a confidence decision threshold based on the collected statistics; executing the classifier on an evaluation set of nominal and degraded sensor data values, to generate a second set of confidence values; deciding whether the sensor data values of the evaluation set are nominal or degraded based on a comparison of the second set of confidence values to the confidence decision threshold; and calculating a score to evaluate the trained classifier based on a verification of the decisions. The method may further include generating a next-generation set of CF configurations using a genetic selection algorithm based on the scores.

According to another aspect there is provided a system. The system may include an initialization module to select an initial set of classifier and feature-set (CF) configurations. The system may also include a processing module to perform an iteration for each of the CF configurations. The processing module may include a classifier training module to train the classifier of the CF configuration based on a training set of nominal sensor data values. The processing module may also include a threshold determination module to: execute the classifier on the training set to generate a first set of confidence values; collect statistics on the first set of confidence values; and calculate a confidence decision threshold based on the collected statistics. The processing module may further include a classifier evaluation module to: execute the classifier on an evaluation set of nominal and degraded sensor data values, to generate a second set of confidence values; and decide whether the sensor data values of the evaluation set are nominal or degraded based on a comparison of the second set of confidence values to the confidence decision threshold. The processing module may further include a score calculation module to calculate a score to evaluate the trained classifier based on a verification of the decisions. The system may further include a CF configuration reproduction module to create a next-generation set of CF configurations using a genetic selection algorithm based on the scores.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method for estimation of sensor data confidence, said method comprising:
   selecting an initial set of classifier and feature-set (CF) configurations;
   performing an iteration for each of said CF configurations, said iteration comprising:
      training said classifier of said CF configuration based on a training set of nominal sensor data values,
      executing said classifier on said training set to generate a first set of confidence values,
      collecting statistics on said first set of confidence values,
      calculating a confidence decision threshold based on said collected statistics,
      executing said classifier on an evaluation set of nominal and degraded sensor data values, to generate a second set of confidence values,
      deciding whether said sensor data values of said evaluation set are nominal or degraded based on a comparison of said second set of confidence values to said confidence decision threshold, and
      calculating a score to evaluate said trained classifier based on said second set of confidence values; and
   generating a next-generation set of CF configurations using a genetic selection algorithm based on said scores, said genetic selection algorithm including at least one random selection of CF features to introduce a mutation in said generated next-generation set of CF configurations; and
   determining said generated next-generation set of CF configurations is valid based on executing said classifier on an evaluation set of nominal and degraded sensor data values, and in response to determining the generated next-generation set of CF configurations is valid, providing the sensor data values and a confidence value based on the generated next-generation set of CF configurations to a decision-making system.

2. The method of claim 1, wherein said collected statistics include a mean and a standard deviation of said first set of confidence values, and said confidence decision threshold is set to a value below said mean, wherein the difference between said mean and said confidence decision threshold is proportional to said standard deviation.

3. The method of claim 1, wherein calculating a score to evaluate said trained classifier further comprises calculating a percentage missed value (Pm), representing the percentage of degraded sensor data values classified as nominal, and a percentage false positive value (Pf), representing the percentage of nominal sensor data values classified as degraded.

4. The method of claim 3, wherein said calculating of said score further comprises averaging said Pm and said Pf.

5. The method of claim 1, further comprising continuing to generate additional generations of CF configurations to perform validation on if said validation fails.

6. The method of claim 1, wherein said sensor data is image data, radar data or LIDAR data, and said decision-making system is an autonomous vehicle.

7. A system for estimation of sensor data confidence, said system comprising:
   a processor configured to:
      select an initial set of classifier and feature-set (CF) configurations;
      perform an iteration for each of said CF configurations, said iteration comprising:

train said classifier of said CF configuration based on a training set of nominal sensor data values, execute said classifier on said training set to generate a first set of confidence values, collect statistics on said first set of confidence values, calculate a confidence decision threshold based on said collected statistics, execute said classifier on an evaluation set of nominal and degraded sensor data values, to generate a second set of confidence values, decide whether said sensor data values of said evaluation set are nominal or degraded based on a comparison of said second set of confidence values to said confidence decision threshold, and calculate a score to evaluate said trained classifier based on a said second set of confidence values;

generate a next-generation set of CF configurations using a genetic selection algorithm based on said scores, said genetic selection algorithm including at least one random selection of CF features to introduce a mutation in said generated next-generation set of CF configurations; and determine said generated next-generation set of CF configurations is valid based on executing said classifier on an evaluation set of nominal and degraded sensor data values, and in response to determining the generated next-generation set of CF configurations is valid, providing the sensor data values and a confidence value based on the generated next-generation set of CF configurations to a decision-making system for purposes of real-time operations; and wherein said sensor data is image data, radar data or LIDAR data, and said decision-making system is an autonomous vehicle.

8. The system of claim 7, wherein said collected statistics include a mean and a standard deviation of said first set of confidence values, and said confidence decision threshold is set to a value below said mean, wherein the difference between said mean and said confidence decision threshold is proportional to said standard deviation.

9. The system of claim 7, wherein calculating a score to evaluate said trained classifier further comprises calculating a percentage missed value (Pm), representing the percentage of degraded sensor data values classified as nominal, and a percentage false positive value (Pf), representing the percentage of nominal sensor data values classified as degraded.

10. The system of claim 9, wherein said calculating of said score further comprises averaging said Pm and said Pf.

11. The system of claim 7, wherein said system is further configured to continue to generate additional generations of CF configurations to perform validation on, if said validation fails.

12. An article comprising a non-transitory storage medium having stored thereon instructions that when executed by a machine result in the following operations:

selecting an initial set of classifier and feature-set (CF) configurations;

performing an iteration for each of said CF configurations, said iteration comprising:

training said classifier of said CF configuration based on a training set of nominal sensor data values, executing said classifier on said training set to generate a first set of confidence values, collecting statistics on said first set of confidence values, calculating a confidence decision threshold based on said collected statistics, executing said classifier on an evaluation set of nominal and degraded sensor data values, to generate a second set of confidence values, deciding whether said sensor data values of said evaluation set are nominal or degraded based on a comparison of said second set of confidence values to said confidence decision threshold, and calculating a score to evaluate said trained classifier based on said second set of confidence values; and generating a next-generation set of CF configurations using a genetic selection algorithm based on said scores, said genetic selection algorithm including at least one random selection of CF features to introduce a mutation in said generated next-generation set of CF configurations; and determining said generated next-generation set of CF configurations is valid based on executing said classifier on an evaluation set of nominal and degraded sensor data values, and in response to determining the generated next-generation set of CF configurations is valid, providing the sensor data values and a confidence value based on the generated next-generation set of CF configurations to a decision-making system.

13. The article of claim 12, wherein said collected statistics include a mean and a standard deviation of said confidence values, and said confidence decision threshold is set to a value below said mean, wherein the difference between said mean and said confidence decision threshold is proportional to said standard deviation.

14. The article of claim 12, wherein calculating a score to evaluate said trained classifier further comprises calculating a percentage missed value (Pm), representing the percentage of degraded sensor data values classified as nominal, and a percentage false positive value (Pf), representing the percentage of nominal sensor data values classified as degraded.

15. The article of claim 14, wherein said calculating of said score further comprises averaging said Pm and said Pf.

16. The article of claim 12, further comprising generating additional generations of CF configurations to perform validation on if said validation fails.

17. The article of claim 12, wherein said sensor data is image data, radar data or LIDAR data, and said decision-making system is an autonomous vehicle.

* * * * *